Figure 1:
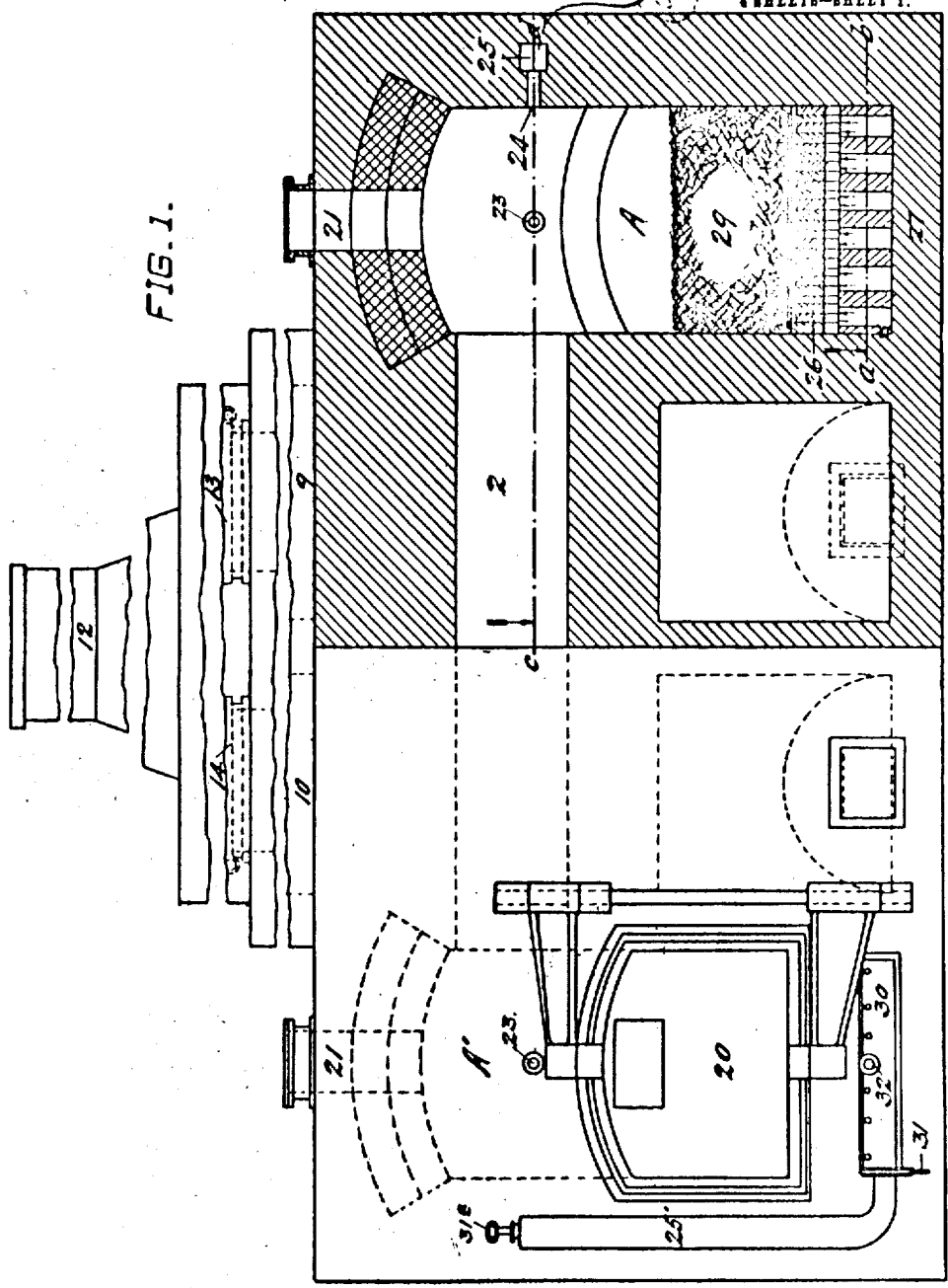

No. 781,242. PATENTED JAN. 31, 1905.
J. C. H. STUT.
METHOD OF MANUFACTURING GAS AND COKE FROM CRUDE OIL.
APPLICATION FILED APR. 6, 1904.

4 SHEETS—SHEET 1.

WITNESSES,
Chas. E. Chapin

INVENTOR,
John C. H. Stut
By Geo. H. Strong. Atty

No. 781,242. PATENTED JAN. 31, 1905.
J. C. H. STUT.
METHOD OF MANUFACTURING GAS AND COKE FROM CRUDE OIL.
APPLICATION FILED APR. 6, 1904.

4 SHEETS—SHEET 2.

WITNESSES,
Chas. E. Chapin.

INVENTOR.
John C. H. Stut
By Geo. H. Strong.
Atty

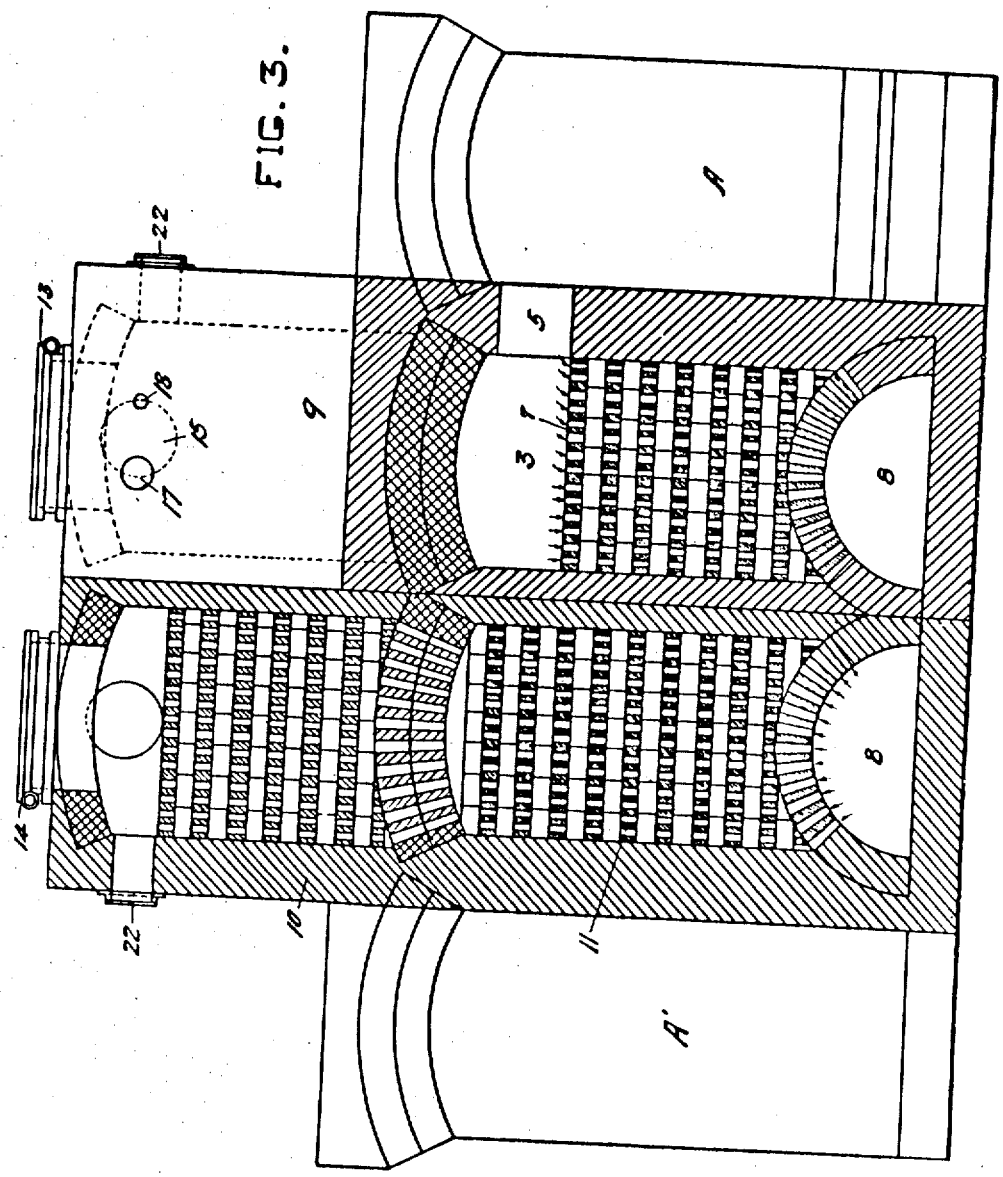

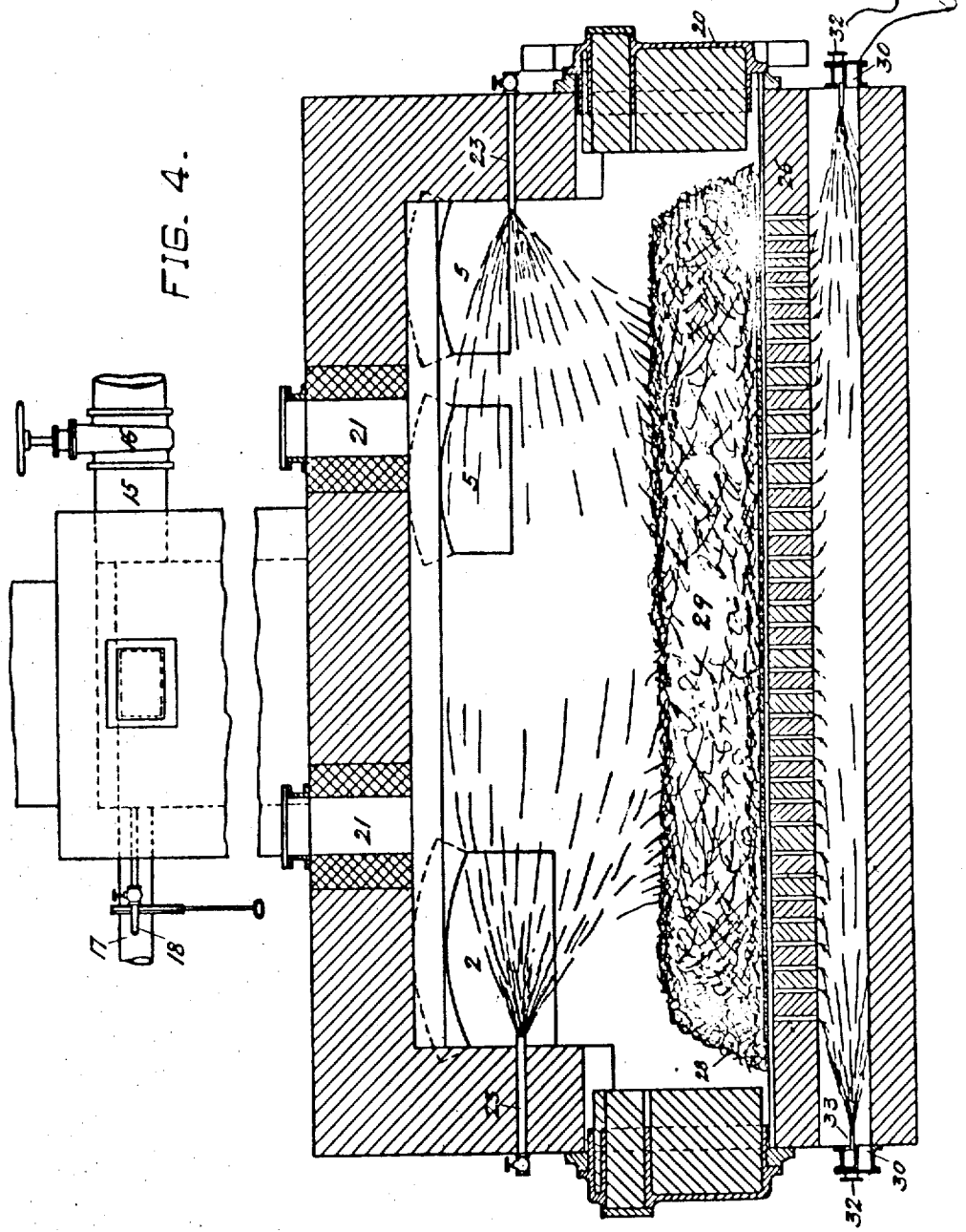

No. 781,242.

Patented January 31, 1905.

UNITED STATES PATENT OFFICE.

JOHN C. H. STUT, OF OAKLAND, CALIFORNIA.

METHOD OF MANUFACTURING GAS AND COKE FROM CRUDE OIL.

SPECIFICATION forming part of Letters Patent No. 781,242, dated January 31, 1905.

Application filed April 6, 1904. Serial No. 201,852.

*To all whom it may concern:*

Be it known that I, JOHN C. H. STUT, a citizen of the United States, residing at Oakland, in the county of Alameda and State of California, have invented new and useful Improvements in Manufacturing Gas and Coke from Crude Oil, of which the following is a specification.

My invention relates to an improved process for the manufacture of coke and illuminating-gas from crude oil.

The making of gas from crude oil alone is not new; but the usual methods of making so-called "oil-gas" from crude oil have been very unsatisfactory and unscientific. It is customary in making so-called "oil-gas" to spray the oil directly upon and against all shapes of hot fire-brick or other refractory material contained in an oven or retort, irrespective of the form, space, or temperature such oven and brickwork might have. The space into which the oil is sprayed is usually very small and cramped. Quite often the oil is sprayed directly on or into brick checker-work, so that the oil when it enters the oven strikes directly against arches, corners, walls, checker-work, and like obstructions. Furthermore, the brickwork is kept at a very high temperature both in the heating and gas-making periods. The oil-gas made in ovens so constructed is not of the best quality, nor is the oil used to the best advantage, and for the following reasons: First, the oil on entering the oven strikes against hot brickwork of some kind before it has time to distil off its illuminating-gases; second, the temperature of this brickwork must be kept very high in order to gasify all the oil, and particularly the heavier portions thereof. On the first point of "time" for the oil to form into gas it may be said: When the oil is introduced into ovens as constructed at present, it strikes against hot brickwork of some kind. The molecules of the oil are therefore not given time to rearrange themselves into a gas form, because the surface or catalytic action of the brickwork against which it strikes right after entering the oven prevents this. That this is so is a subject easy of proof. For instance, let a piece of iron or other material not easy to be consumed be held in a gas-flame. It will be found that the flame will commence to smoke and carbon or lampblack will be deposited on the iron, because the combustion or chemical reaction of the molecules of the gas and air have not sufficient time to rearrange themselves for the new combination before they strike the iron, the surface action of the iron preventing this. The same result will also occur, although in a minor degree, when the iron is heated before it is held in the flame; but let the iron be removed far enough from the flame or zone of chemical reaction. Then no smoke will occur, because the chemical process has time to develop before the gases strike the iron. Thus it is seen time and space are important factors in effecting separation of the oil-molecules. The third factor is that of temperature. As said above, the temperature in the ovens used at present must be kept very high in order to gasify all the heavier portions of the oil. This is objectionable for the reason that by using a very high temperature in the ovens all the lighter oils are split up into their elements—hydrogen and carbon, or so-called "lampblack." Under usual practices the oil is sprayed into a highly-heated cramped oven or chamber directly upon or against an incandescent brick surface or checker-work, the fallacy being that it is necessary to "crack" the entire body of oil. The practical result is that the lighter hydrocarbons most rich in illuminating power are converted mainly into lampblack, which is deposited in vast quantities in the carbureters and regenerators, and a very poor commercial gas is produced. Furthermore, the impinging of the oil direct on the brickwork is also very detrimental to the brickwork. From experience it is shown that the very best fire-brick is soon destroyed and eaten away and has continually to be rebuilt. Arches, walls, and checker-work crumble rapidly where the intense flame strikes and impinges against them, incurring thereby great delay and expense for stoppages and repair to the ovens and brickwork. At present the gas-makers get their illuminating-gas mostly from the heavier portions of the oil, whereas the lighter portions are lost for this purpose, because the high heat and surface action of the highly-heated brickwork cause the dissociation of the oil into hydrogen and carbon or lampblack, as explained.

First, in my process I use a very large empty space into which the oil is introduced from two opposing sides, whereby I avoid the very detrimental surface or catalytic action of the brickwork on the oil and reciprocally of the oil on the brickwork. If one stream of oil only were used, it would enter with such velocity as would carry the oil across the chamber and cause it to impinge on the opposing wall, and this surface action would again occur here. By using a relatively large oven and two opposing streams of oil the latter is evenly distributed in the oven, and the oil streams, meeting centrally of the chamber and away from any brickwork, give the molecules in the crude oil time to rearrange themselves into gas-molecules from the lighter oil, while all the heavier oil can drop onto and into the permeable matter contained in the lower portion of the chamber over the hearth to become coked, or, in other words, by this method I arrange for a separation of the crude oils in the oven so that the lighter and more fugitive oil portions have time to become a valuable illuminating-gas, whereas the heavier oil residues have time to separate out, drop onto and into the permeable material, where the surface action is wanted, leaving the carbon there free to become coked, as desired. Secondly, with my large oven-chamber, with plenty of space and time for effecting separation of the gas-molecules, I employ a moderate temperature, or such a heat as will not split up the entire body of oil and drive off as gas the cokable molecules, depending for the gas-making on radiated heat from the walls and arches and flooring of the oven. It is thus observed that three things are prominently in view in my process—space, time, and temperature.

Any suitable form of the apparatus, preferably of multiple-connected contiguous-oven type, may be used in carrying out this process.

In the accompanying drawings I have shown an apparatus especially adapted for working the process.

Figures 2, 5:
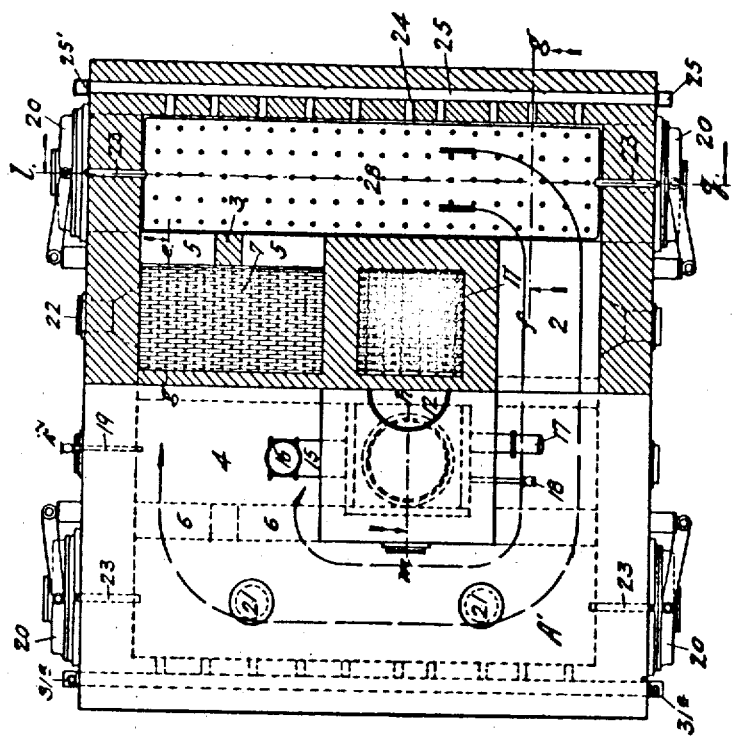

Figure 1 is a front elevation, partly in section, taken on line f g of Fig. 2. Fig. 2 is a plan view, partly in section, taken on line c d of Fig. 1. Fig. 3 is an elevation, partly in section, taken on line e g h m of Fig. 2. Fig. 4 is a section taken on line g l of Fig. 2. Fig. 5 is a section taken on line a b of Fig. 1.

A A' represent two parallel ovens connected above the fuel-line at one end by a large flue 2 and each connecting at the opposite end with an intermediate, individual, and respective carbureter 3 4 through passages 5 6. The carbureters are filled with the usual brick checker-work 7 and connect at the bottom through openings 8 with respective regenerators 9 10, also disposed b  een the ovens. By arranging the carburete. and regenerators thus between the ovens they receive the benefit of a great amount of radiated heat therefrom. The regenerators also are filled with checker-work 11, and each discharges into a single stack 12, common to both. Each regenerator is provided with a respective stack-valve 13 14 and a gas-pipe 15, leading to the scrubbers and collectors. (Not here shown.)

16 is a gas-valve in each pipe 15.

Air and steam may be admitted into the regenerators through respective valved pipes 17 18, and each carbureter is provided with an oil-pipe 19, which may be used in water-gas manufacture when it is desired to carburize or enrich the gas.

20 represents oven-doors, 21 covered ports for the entry of material from the top into the ovens, and 22 doors leading to the top of the regenerators.

Oil for purposes of heating and gas-making is admitted into opposite ends of each oven through pipes 23. Air to effect combustion of the gases in the ovens is admitted from the sides through the ports 24, connecting with the valved ducts 25. By having the air and oil streams counter to each other and admitting air practically at all points along the inflammable-vapor column combustion is greatly assisted and heating is much more quickly effected.

The hearths 26 are perforate, and the space beneath the hearths is occupied by a     of longitudinal parallel supports 27, while  top of each of the hearths rests a removable perforated metal plate 28, supporting a body of coke or coal or preferably a layer 29 of refractory porous material. Air is admitted beneath the hearths and at each end thereof from pipes 25', connecting with ducts 25 through boxes 30, having each an opening extending across the ends of the passages between the supports 27. The admission of air beneath the hearths may be regulated by slide-valves 31 and to ducts 25 by valves 31*. Steam may be admitted beneath each hearth and at opposite ends thereof through a pipe 32, having a series of nozzles 33 directing a jet in between the several supports 27, whence the steam may pass upward through the hearths and permeable layer, there to contact with the contained incandescent carbon to become water-gas. The steam-nozzles are preferably disposed above the air-inlets.

In operation one oven is used alternately with the other. To heat up the ovens, assuming the operation to be first from left to right, the gas-valves 16 are closed as well as stack-valve 14, while stack-valve 13 is opened. Oil is admitted through pipes 23 at opposite ends of oven A' only, some steam being used with the oil to effect atomization. The two streams meet in the middle of the oven, making a uniform heat over the whole surface, and intense combustion occurs in the heating period by this means. Air to support the combustion is admitted through the regenerator 10 and through the side ports 24 in the brick wall of oven A'. Air in sufficient quantity only will be admitted from underneath the hearth, so as to consume the lighter hydrocarbons that might trickle down with the heavier residue into the refractory material 29, leaving thus the residue to form into coke in and on this refractory material. Of course it is understood that the amount of oil introduced into the ovens must be so regulated as to be neither too much nor too little, because if too much it will have such a cooling effect that a large amount of residue or tar will result with little or no coke. On the other hand, when too little oil is introduced it will be all consumed and no coke will be made. The quantity of oil to be introduced will depend on the quality of the oil, the amount of heat stored in the ovens, the temperature of the ovens, and the amount of air introduced either from above or from below the hearths. Particularly will it be noted that the oil is not made to impinge directly upon or into any brickwork. This is very important, not alone for the heating and coking period, but also for the gas-making period, because, as explained above, it gives time for the chemical rearrangement of the molecules to take place and effect a perfect combustion of the lighter oils in the heating period and for the heavier residues become coked in the permeable layer 29, while this large empty space in the ovens and the time necessary before the oil strikes against any brickwork are also necessary in the gas-making period. In the latter period this large space allows the lighter oils or hydrocarbons to distil off and rearrange themselves into a good illuminating-gas without any interference of surface action, and so prevents the formation of a large amount of lampblack and inferior illuminating-gas. All chemical reactions require some time for development, and this is true in making illuminating-gas from oil. During the heating period for oven A' the oil from the two meeting streams, with a regulated quantity of air above and below the hearth, will serve to heat up the walls of both ovens and carbureter 3 and regenerator 9. The more volatile and fugitive oils are consumed, while the heavier residue of the oil drops onto the porous layer 29 and percolates therein and as the heat grows intenser is converted into coke. The blasting is continued until this layer and its incumbent and interpercolated coke is in a state of incandescence, but is stopped short of the actual consumption of the coke. Some volatile oil of course will have been carried down with the heavier residue when the latter became separated from the more volatile portion in the oven, and it is the consumption of this volatile accompaniment in the body of refractory material that furnishes the intense and quick heat. It is understood that the porous layer and incumbent and interpenetrated coke may be incandescent and still not create such a heat in the oven-space itself as to destroy the rearrangement of oil-molecules, which, as before stated, is so important and which should take place both in the heating and gas-making periods. It is to be borne in mind that the oil-body as it comes into the ovens is not acted on by surface or catalytic action. The only part of the oil affected by surface action is the separated heavier deposited particles, and these are gradually converted into coke. It is necessary to remark at this point that the surface action of the layer 29 must not be such as to split up the deposit and drive it off as gases, since this process contemplates, essentially, the manufacture of oil-coke in the heating period. Consequently the amount of air admitted from below the hearth is regulated according to the quality and density of the oil used. Likewise the temperature of the ovens is dependent on the same cause. When a proper degree of heat has been attained in the ovens, carbureter, and regenerator, the stack-valve 13 is closed. Also the air-passages in the regenerator 10 and above and below the hearths are closed, while the gas-valve leading from regenerator 9 to the scrubbers is opened. The apparatus is now ready for the gas-making. The spraying of the oil in two opposing streams into oven A' is continued. The gas now generated by the radiated heat of the oven-walls travels from chamber A', through the large connecting-passage 2, to oven A, thence traversing the length of the latter passes through the openings 5 into carbureter 3 and regenerator 9. It is not until the gas meets the checker-work in the carbureter that any obstruction is encountered.

By this process I make a large amount of gas from the oil without breaking up too much of the lighter oils or hydrocarbon into hydrogen and carbon or so-called "lampblack," which does occur when the oil is sprayed or driven directly onto hot brick or checker-work, as explained above. The heavier oils that are not gasified in the large space above the refractory material will trickle on and into the incandescent coke or refractory material to be split up subsequently into hydrogen or coke.

The ovens A' A and the connecting-passage 2, all devoid of baffle-walls and the like, afford the space which is one factor in carrying out successfully my process. Time, the second factor, is provided for in the interval necessary for the gas to traverse this space. Temperature, the third factor, is regulated according to the nature of the oil used. If a very heavy oil—say 12 Baumé—is used, the ovens could stand and would need a higher degree of heat than if a lighter oil, as 25° Baumé, were used. In the former instance the desired temperature might be from 1,500° to 2,500° Fahrenheit, more or less. In the latter it might be from 1,200° to 2,000° Fahrenheit, more or less. I choose to express the desired temperature as being "moderate" as distinguished from the usual intense disintegrating heat of present processes. My oven-walls may be incandescent, though the oven-space itself into which the oil is sprayed would be relatively moderate in temperature, for it is apparent that the effect on the oil is far different where it is subjected to radiated or reverberated heat only than where it is impinged directly upon an incandescent brick wall. In my process the volatile oils and gases do not contact with the brickwork to any extent until they have traversed both ovens and come into the carbureters. The result is the molecules of the greater portion of volatile oil find time to rearrange themselves into molecules of illuminating-gas. While some lampblack may of necessity be deposited in the carbureter, the amount, compared with that produced under ordinary methods, is trifling. Under ordinary methods, as before stated, nearly if not quite the entire body of the volatile-product distillations are made into lampblack and the gas is made from the heavier residues. In my method the gas is made from the volatile oils and coke from the heavier residues. The volatile parts of the oil are capable of forming a very large percentage of gas. The heavier residues make an excellent coke, and the commercial value of coke is far greater than that of lampblack. After a certain period of gas-making the ovens will cool down to a point such as to require reblasting.

The coke made in the heating period may be utilized—

First, by consuming all the coke in the gas-making period in the manufacture of water-gas. To do this, a regulated quantity of steam is admitted from opposite ends beneath oven A' and allowed to pass up through the grate and permeable body of hot material and coke.

Second, by building up layers of coke one after another in successive heating periods, letting in at such times only enough air to generate heat for coking without consuming the coke until a sufficient quantity of this coke has accumulated in an oven to withdraw it from this oven through the doors 20 to be used for any commercial purpose. As previously described, the permeable refractory material rests on a perforated iron plate, which in turn rests on the perforated brickwork or hearth. When this iron plate is drawn out from the oven through a door 20, all the material on top of this plate is also drawn out with it, and in this way the coke is recovered from the oven. It will thus be seen that coke is made from crude oil and that water-gas may be made from this coke, and all in the same apparatus, without losing any of the heat that is contained in the coke, or commercial coke from the heavier residue of crude oil and illuminating-gas from the lighter portions of this same oil can be made all in the same apparatus and at the same time, or one oven might be used to produce coke from oil and water-gas from this coke, and the other oven may produce coke from oil for commercial purpose, whereas the lighter oils from the oil used for making coke in this latter oven can be used to enrich the water-gas coming from the first oven, or both ovens might be used to make commercial coke and the lighter oils used alone for making illuminating-gas. All these different results flow from and are steps in this process of making coke from crude oil.

As already explained, the temperature employed and the amount of air used in the heating period must be so arranged and can be so regulated as to produce either more oil-gas or less coke or more coke and less gas, as might be most advantageous. By regulating these factors I am enabled to produce a good illuminating-gas and a good coke from crude oil alone.

While in the gas-making period the lighter oils will be making illuminating-gas the heavier oil residues will be accumulating in the bottom of the oven and will eventually form a considerable layer of uncoked material interpenetrating more or less the permeable body 29. This uncoked layer in oven A' will be transformed to coke in the heating period subsequent to the next succeeding heating and gas-making periods in oven A. In practice the ovens are worked alternately. Generally blasting and gas-making will go on in one oven, as A', and then blasting and gas-making in the other oven, or A. On the other hand, I may blast in oven A, for example, afterward closing both stack-valves and the gas-valves of regenerator 10 and opening the gas-valve in regenerator 9 and then admit oil into the relatively cooler oven A'. This latter oven, while hot enough to gasify the lighter hydrocarbons, will not effect such sudden dissociation of the oil-molecules as might occur if the oil was admitted to oven A immediately after blasting. This is another way of getting my "moderate temperature" to allow for molecular rearrangement. From oven A' the gas then passes through the hotter oven A to the carbureter 3 and regenerator 9 to become fixed. If desired, the ovens may be worked conjunctively similarly as before described to make oil-gas in oven A' and water-gas in oven A, where the hottest coke is.

It will be observed that the ovens are blasted from the ends, that the heat and gases pass endwise through both ovens, and that the direction of transit of the heat and gases through the ovens is alternate in successive periods.

To summarize: I have a large oven-space. The large space prevents the oil from striking against any protruding brickwork. It allows the heavier oil time to separate and drop out from the lighter oil. The oil is acted on by radiated heat. In the bottom of the space provision is made for the receipt of the heavier oil, where it is coked. This large oven-space has only a moderate heat, so as to make as much gas and as little lampblack as possible. The residue of the oil is made into coke in the heating period to be used commercially or for making water-gas, but not intended as fuel in the ovens. While the process is a process of making gas and coke from crude oil, the manufacture of coke embraces the step of making gas, or, conversely, the making of oil-gas is but an incident or step in the oil-coke-making. In case I make water-gas I do not alter the previous steps of making coke and oil-gas, but merely go a step further. In other words, the manufacture of water-gas includes the making of coke, and the making of coke from oil includes the making of oil-gas.

This process is to be differentiated from the usual practice of "carbureting." It is common to carburet or enrich water-gas by spraying oil into the carbureter.

Having thus described my invention, what I claim, and desire to secure by Letters Patent, is—

1. The process of manufacturing gas and coke which consists in heating to moderate heat an oven having a large empty space above a layer of porous non-combustible material, spraying oil from opposite ends into said oven, coking the residue from the oil in and on said porous material in the heating period, and injecting oil in the gas-making period into this oven-space to make oil-gas and deposit a residue on the already coked residuum.

2. The process of manufacturing gas and coke which consists in heating to moderate heat an oven having a large empty space above a layer of porous non-combustible material, spraying oil from opposite ends into said oven, coking the residue from the oil in and on said porous material in the heating period, and injecting oil in the gas-making period into this oven-space to make oil-gas and deposit a residue on the already coked residuum, passing steam up through said coked residuum and mixing these gases in the oven-chamber.

3. The process of manufacturing gas and coke which consists in subjecting crude oil in an oven-chamber to heat sufficient only to effect a dissociation of the lighter from the denser portions of the oil and affording time and space for said lighter portions to rearrange themselves into a fixed illuminating-gas and converting the denser residue into coke in the same oven-chamber.

4. The process of manufacturing gas and coke which consists in subjecting crude oil in an oven-chamber to heat sufficient only to effect a dissociation of the lighter from the denser portions of the oil and affording time and space for said lighter portions to rearrange themselves into a fixed illuminating-gas, depositing said denser portions in the same oven-chamber, and in a succeeding heating period converting said deposit into coke.

5. The process of manufacturing gas and coke which consists in subjecting crude oil in an oven-chamber to heat sufficient only to effect a dissociation of the lighter from the denser portions of the oil and affording time for said lighter portions to rearrange themselves into a fixed illuminating-gas, depositing said denser portions, and in a succeeding heating period converting said deposit into coke by admitting air from above and below.

6. The process of manufacturing gas and coke which consists in heating a permeable body in an oven-chamber to incandescence, admitting oil to said chamber in such manner as to prevent its impinging on said heated body and regulating the heat of said oven in such manner as to allow the more volatile portions of the oil to separate from the heavier portions, the more volatile portions passing off as illuminating-gas, the heavier portions dropping onto the said permeable body in the oven-chamber, and said chamber affording room for a molecular rearrangement of the gasified particles of oil and preventing the formation in large quantities of lampblack.

7. The process of manufacturing gas and coke which consists in heating a permeable body in an oven-chamber to incandescence, admitting oil to said chamber in such manner as to prevent its impinging on said heated body and regulating the heat of said oven in such manner as to allow the more volatile portions of the oil to separate from the heavier portions, the more volatile portions passing off as illuminating-gas, the heavier portions dropping onto the said permeable body in the oven-chamber, and said chamber affording room for a molecular rearrangement of the gasified particles of oil and preventing the formation in large quantities of lampblack and subsequently in the same apparatus converting the heavier residuum of the oil into coke.

8. In the process of making gas and as a step therein the making of coke in commercial quantities from crude oil which consists in spraying oil into an oven-chamber heated to such temperature as will allow a dissociation of the volatile portions of the oil from the heavier portions but will not gasify the latter, depositing these heavier portions on and in a body of permeable matter and admitting air from above and below said matter to consume the lighter hydrocarbons and to convert the deposited residue into coke.

9. The process of manufacturing gas and coke from crude oil alone, said process consisting in spraying oil into opposite ends of one of two heated connected ovens, each of which incloses a relatively large unobstructed space through which the gases of combustion and the evolved illuminating-gases may travel unobstructed to effect a molecular rearrangement of the lighter hydrocarbons thereby avoiding wasteful accumulations of lampblack, and converting by surface action the deposited oil residuum in the oven into coke.

10. The process of manufacturing gas and coke from crude oil which consists in alternately heating an oven in one period and making gas therein in a succeeding period, said heating period comprehending the admission of oil from opposite ends of the oven, allowing the lighter hydrocarbons to be consumed and the heavier residuum of the oil to be deposited in the bottom of the oven, admitting air above and below said residuum to convert the latter into coke, then shutting off the air and in the gas-making period admitting oil as before to said oven, converting the lighter hydrocarbons into illuminating-gas by radiated heat and depositing the heavier oil residuum in the oven-chamber.

11. The process of manufacturing gas and coke from crude oil which comprehends heating an oven-chamber, admitting oil thereinto, allowing the lighter hydrocarbons to become converted into illuminating-gas and the heavier oil residuum to be deposited in the bottom of the oven-chamber, then admitting air above and below said residuum to consume the lighter hydrocarbons and to convert the residuum into coke.

12. The process of manufacturing gas and coke in commercial quantities from crude oil alone which comprehends the heating of contiguous connected ovens to a temperature such as will not effect the gasification of the heavier residual deposits of the oil, spraying oil alternately into said ovens in such manner as to prevent catalytic action, the oven into which oil is temporarily not sprayed affording space for the molecular rearrangement of the lighter hydrocarbons into illuminating-gas, and coking the oil residue in said ovens.

13. The process of manufacturing gas and coke in commercial quantities from crude oil alone which comprises the heating of contiguous connected ovens to a temperature such as will not effect the gasification of the heavier residual deposits of the oil, spraying oil into one of said ovens and permitting the distilled lighter hydrocarbons time for molecular rearrangement into illuminating-gas by passing such distillations through the other oven, then reversing the process, coking the residuum first deposited and blasting and gas-making in the second oven.

14. The process of manufacturing gas and coke which consists in heating an oven-chamber to a heat sufficient only to effect a dissociation of the lighter from the heavier portions of the oil, admitting oil into said oven-chamber in such manner as to prevent catalytic action and affording time for said lighter portions to rearrange themselves into a fixed illuminating-gas, and converting the denser residue into coke.

15. The process of manufacturing gas and coke which consists in heating an oven-chamber sufficient only to effect a dissociation of the lighter from the denser portions of the oil, admitting oil into said oven-chamber in such manner as to prevent catalytic action and affording time for said lighter portions to rearrange themselves into a fixed illuminating-gas, depositing said denser portions in said oven-chamber and converting the same into coke.

16. The manufacture of gas from crude oil which comprehends heating a relatively large oven-space, forcibly spraying oil in a substantially horizontal direction into said space in such manner as to prevent surface action of the oil upon the brickwork, the temperature of the space being sufficient only to effect the dissociation of the lighter from the denser portions of the oil, affording time for the lighter particles of the oil to rearrange themselves into a fixed illuminating-gas, and depositing the heavier oil residue.

In testimony whereof I have hereunto set my hand in presence of two subscribing witnesses.

JOHN C. H. STUT.

Witnesses:
 WARREN DIBBLE,
 G. M. DOGGETT.